(12) United States Patent
Ishikawa et al.

(10) Patent No.: US 11,429,187 B2
(45) Date of Patent: Aug. 30, 2022

(54) CONTROLLER APPARATUS, CONTROL METHOD THEREOF, AND PROGRAM

(71) Applicant: Sony Interactive Entertainment Inc., Tokyo (JP)

(72) Inventors: Kiyotaka Ishikawa, Tokyo (JP); Shin Kimura, Tokyo (JP); Kazuyoshi Enomoto, Tokyo (JP); Masaaki Tonogai, Chiba (JP); Takuro Sawada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/284,065

(22) PCT Filed: Oct. 19, 2018

(86) PCT No.: PCT/JP2018/039096
§ 371 (c)(1),
(2) Date: Apr. 9, 2021

(87) PCT Pub. No.: WO2020/079854
PCT Pub. Date: Apr. 23, 2020

(65) Prior Publication Data
US 2021/0405748 A1 Dec. 30, 2021

(51) Int. Cl.
*G09G 5/00* (2006.01)
*G06F 3/01* (2006.01)
(Continued)

(52) U.S. Cl.
CPC .............. *G06F 3/014* (2013.01); *A63F 13/24* (2014.09); *G06F 3/038* (2013.01)

(58) Field of Classification Search
CPC . G06F 3/01; G06F 3/014; G06F 3/038; A63F 13/24
See application file for complete search history.

(56) References Cited

U.S. PATENT DOCUMENTS 8,428,664 B1 4/2013 Wyers
9,124,273 B2 9/2015 Unterreitmayer
(Continued)

FOREIGN PATENT DOCUMENTS

JP 3179614 U 11/2012
JP 2013513840 A 4/2013
(Continued)

OTHER PUBLICATIONS

International Search Report for corresponding PCT Application No. PCT/JP2018/039095, 2 pages, dated Nov. 13, 2018.
(Continued)

*Primary Examiner* — Joe H Cheng
(74) *Attorney, Agent, or Firm* — Matthew B. Dernier, Esq.

(57) ABSTRACT

Provided is a controller apparatus worn on a user's hand that includes a first sensor disposed at a position on a controller body where a plurality of fingers of the user come into contact with the controller body when the user grips the controller body and detects spatial positional displacement between the plurality of respective fingers of the user and itself and a second sensor disposed in an area on the controller body that comes into contact with the plurality of fingers of the user when the user grips the controller body, the area being different from the area where the first sensor is disposed, and detects spatial positional displacement between the plurality of respective fingers of the user and itself, in which the first sensor has a higher sensitivity setting than the second sensor.

9 Claims, 7 Drawing Sheets

(51) Int. Cl.
*A63F 13/24* (2014.01)
*G06F 3/038* (2013.01)

(56) References Cited

U.S. PATENT DOCUMENTS

| | | | |
|---|---|---|---|
| 10,534,432 B2* | 1/2020 | Okumura | G06F 3/014 |
| 10,635,171 B2 | 4/2020 | Nakamura | |
| 10,850,192 B2 | 12/2020 | Machida | |
| 10,963,054 B2* | 3/2021 | Nakagawa | A63F 13/424 |
| 10,969,867 B2 | 4/2021 | Nakagawa | |
| 2008/0261693 A1* | 10/2008 | Zalewski | A63F 13/28 |
| | | | 463/31 |
| 2011/0134034 A1* | 6/2011 | Daniel | G06F 3/0202 |
| | | | 345/158 |
| 2013/0057299 A1 | 3/2013 | Unterreitmayer | |
| 2015/0035658 A1* | 2/2015 | Provancher | G05G 9/047 |
| | | | 340/407.1 |
| 2017/0235364 A1 | 8/2017 | Nakamura | |
| 2018/0203509 A1* | 7/2018 | Yamano | G06F 3/016 |
| 2019/0025916 A1* | 1/2019 | Okumura | A63F 13/285 |
| 2019/0038968 A1 | 2/2019 | Machida | |
| 2019/0278372 A1 | 9/2019 | Nakagawa | |
| 2019/0308097 A1* | 10/2019 | Yamano | G06F 3/016 |
| 2020/0341549 A1* | 10/2020 | Ishikawa | A63F 13/211 |
| 2021/0379486 A1* | 12/2021 | Ishikawa | A63F 13/22 |

FOREIGN PATENT DOCUMENTS

| | | |
|---|---|---|
| WO | 2016038953 A1 | 3/2016 |
| WO | 2017150128 A1 | 9/2017 |
| WO | 2018110432 A1 | 6/2018 |

OTHER PUBLICATIONS

International Preliminary Report on Patentability and Written Opinion for corresponding PCT Application No. PCT/JP2018/039095, 11 pages, dated Apr. 29, 2021.
International Preliminary Report on Patentability and Written Opinion for related PCT Application No. PCT/JP2018/039096, 16 pages, dated Apr. 29, 2021.
International Search Report for corresponding PCT Application No. PCT/JP2018/039096, 3 pages, dated Nov. 20, 2018.
Notification of Refusal for corresponding JP Application No. 2020-551714, 7 pages, dated Nov. 17, 2021.

* cited by examiner (a)

| HAND WIDTH W | MIDDLE FINGER MM | RING FINGER RM | LITTLE FINGER PM | MIDDLE FINGER TIP MF | RING FINGER TIP RF | LITTLE FINGER TIP PF |
|---|---|---|---|---|---|---|
| 4 | 22A | 22C | 22D | 22G | 22I | 22J |
| 5 | 22A | 22C | 22F | 22G | 22I | 22L |
| 6 | 22A | 22D | 22F | 22G | 22J | 22L |

(a)

(b)

CONTROLLER APPARATUS, CONTROL METHOD THEREOF, AND PROGRAM

CROSS REFERENCE TO RELATED APPLICATIONS

This is a national phase application of International Application No. PCT/JP2018/039096, filed on Oct. 19, 2018, the entire disclosure of which is hereby incorporated by reference.

TECHNICAL FIELD

The present invention relates to a controller apparatus, a control method thereof, and a program.

BACKGROUND ART

Of controller apparatuses used as home gaming consoles, some are designed to be worn on a user's hand. Such controller apparatuses are worn by being fastened to the user's hand with a belt or the like, so that, when the user bends or stretches each of his or her fingers, the controller apparatuses detect the bending or stretching of the finger in question and outputs an action signal based on the bending or stretching state of the finger in question.

SUMMARY

Technical Problems

However, the user's hand varies in size from one user to another, and in order to detect the bending or stretching state of each finger of the user, it is necessary to consider the user's hand size. As a result, there is a demand for a detection method that permits simple and easy detection of the user's hand size.

The present invention has been devised in light of the foregoing, and it is an object thereof to provide a controller apparatus that can detect the user's hand size in a simple and easy manner and perform a process commensurate with the detected hand size in question.

Solution to Problems

An aspect of the present invention for solving the above problems of the prior art is a controller apparatus worn on a user's hand, the controller apparatus including a controller body, a first sensor that is disposed at a position on the controller body where a plurality of fingers of the user come into contact with the controller body when the user grips the controller body and that detects spatial positional displacement between the plurality of respective fingers of the user and itself, and a plurality of second sensors disposed in an area on the controller body where the plurality of fingers of the user come into contact with the controller body when the user grips the controller body, the area being different from an area where the first sensor is disposed, and that detects spatial positional displacement between the plurality of respective fingers of the user and itself, in which the first sensor has a higher sensitivity setting than the second sensors.

Advantageous Effect of Invention

According to the present invention, it is possible to detect a user's hand size in a simple and easy manner with the first sensor and perform a process commensurate with the detected hand size in question.

BRIEF DESCRIPTION OF DRAWINGS

FIG. 6 is an explanatory diagram illustrating an example of sensor settings for detecting fingers on the controller apparatus according to an embodiment of the present invention.

DESCRIPTION OF EMBODIMENT

Figure 1:
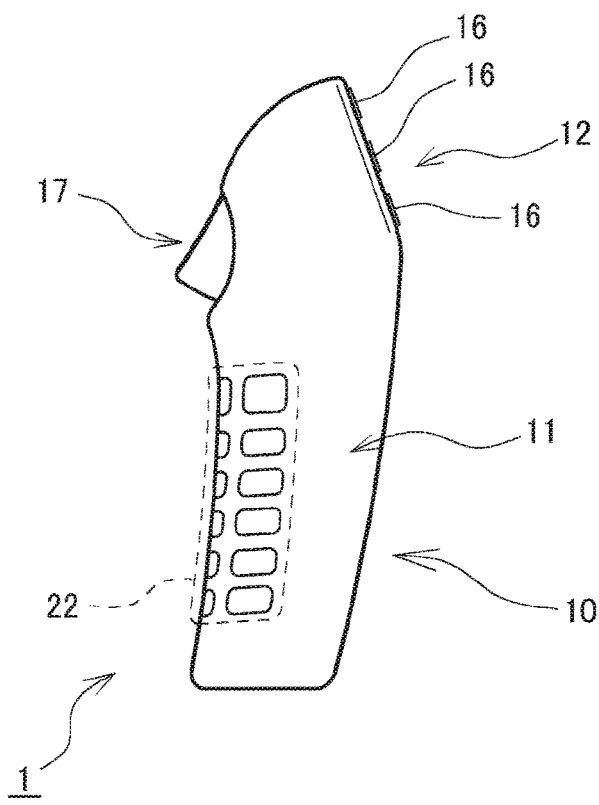
FIG. 1 depicts configuration diagrams schematically illustrating a controller apparatus according to an embodiment of the present invention.
Figure 1:
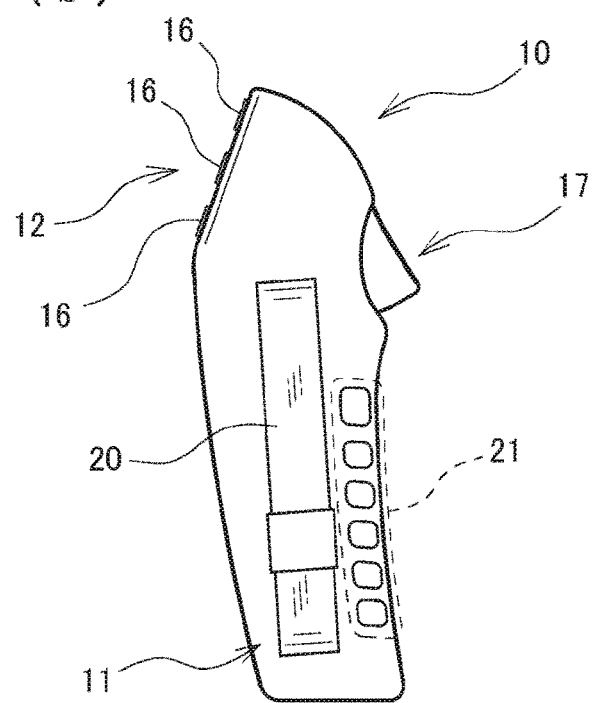
Figure 1:
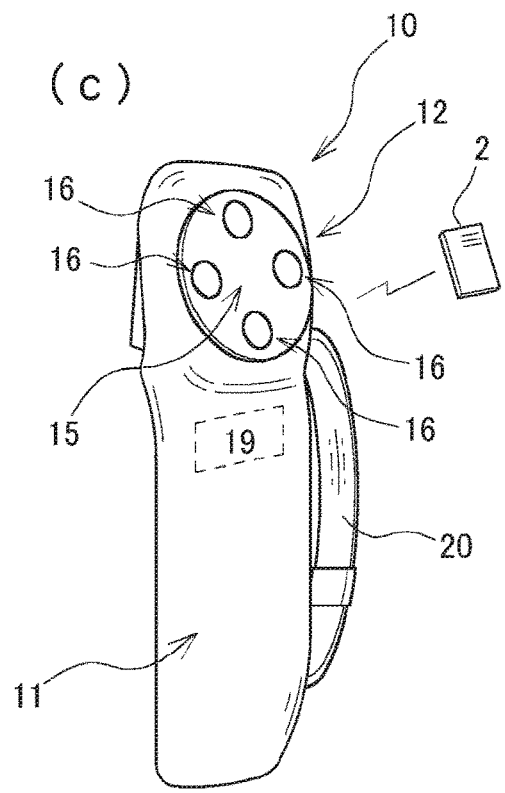

A description will be given of an embodiment of the present invention with reference to drawings. As illustrated in FIG. 1, a controller apparatus 1 according to the embodiment of the present invention includes a controller body 10 and a fixture 20 that maintains a positional relation between the controller body 10 and a user's hand. The controller apparatus 1 is connected to an information processing apparatus 2 in a wired or wireless manner. In the following description of the present embodiment, the sizes of different sections, a ratio in size therebetween, their layout, and the like are merely an example, and examples of the present embodiment are not limited to the sizes, ratio, and layout illustrated or otherwise depicted.

FIG. 1(a) is a left-side view of the controller apparatus 1 of an embodiment of the present invention, FIG. 1(b) is a right-side view of the controller apparatus 1 in question, and FIG. 1(c) is a schematic perspective view of the controller apparatus 1 as viewed from front and slightly left.

The fixture 20 of the controller apparatus 1 is, for example, an annular belt member fastened to both ends of the controller body 10, and the user puts the controller body 10 on his or her hand with the controller body 10 in contact with his or her palm by fastening the belt member of the fixture 20 (narrowing the gap between the fixture 20 and the controller body 10) with his or her four fingers ranging from an index finger to a little finger passed between the fixture 20 and the controller body 10. As described above, as the user puts the controller apparatus 1 on his or her hand with the fixture 20, the controller body 10 will not fall off the user's hand even when the user stretches his or her fingers from a state in which the user is gripping the controller body 10 (from a state in which the controller body 10 is held with the fingers wrapped around the controller body 10).

The controller body 10 includes a grip section 11 and an operation section 12. The grip section 11 can be gripped with at least some of the fingers (the middle finger to the little finger here) passed through the fixture 20. The grip section 11 is substantially in the form of a polygonal column, and the operation section 12 is formed continuously from this grip section 11. Also, the operation section 12 includes a sensor section 15 and a button operation section 16 on a front side and a swing button 17 on a rear side. Also, the operating device 10 incorporates a control circuit 19.

In the example illustrated in FIG. 1, the user places the index finger at a position where the swing button 17 of the operation section 12 can be operated and the thumb at a position where buttons included in the button operation section 16 on the front side can be reached. At this time, the user's middle, ring, and little fingers can grip the grip section 11 (can wrap these fingers around the grip section 11).

Also, at least one first sensor 21 is provided at a position on the grip section 11 where bases of the user's middle, ring, and little fingers come into contact with the grip section 11 when the user grips the controller body 10 to output values commensurate with spatial positional displacement of each of the respective fingers of the user and detect whether or not the user's respective fingers are in proximity to a surface of the grip section 11. The first sensor 21 includes, for example, an electrostatic sensor 21S and a sensor circuit 21C that converts a detection result of the electrostatic sensor 21S into an electric signal and outputs the signal (these two components are depicted together as the first sensor 21 in the figure).

An example of layout of the first sensors 21 and second sensors 22 according to an example of the present embodiment will be described with reference to FIG. 2.

In the example of the present embodiment, the plurality of first sensors 21 are arranged substantially along a longitudinal direction of the grip section 11 in a single column over a length greater than an average width of the hand of an ordinary adult. In the example of FIG. 2, the six first sensors 21 are arranged in a single column. However, the number thereof is not limited thereto.

Further, the plurality of second sensors 22 are arranged discretely (such that their detection ranges do not overlap) at positions on the controller body 10 where parts of the user's middle, ring, and little fingers ranging from their cushions to tips come into contact with the controller body 10 when the user grips the controller body 10, to detect distances to the user's respective fingers. The second sensor 22 also includes, for example, the electrostatic sensor 21S and a sensor circuit 22C that converts a detection result of the electrostatic sensor 21S into an electric signal and outputs the signal (these two components are depicted together as the second sensor 22 in the figure). Further, the second sensors 22 also output values commensurate with spatial positional displacement of each of the respective fingers of the user.

In the example of the present embodiment, the plurality of second sensors 22 are arranged in a matrix pattern (two-dimensionally). In the example of FIG. 2, the second sensors 22 are arranged in two columns along the longitudinal direction of the grip section 11 and six in each column. However, the present embodiment is not limited to such an arrangement of six rows by two columns, and any arrangement may be employed as long as the parts ranging from the cushions to tips of the user's respective fingers are disposed in an area on the controller body 10 where such parts come in contact with the controller body 10 when the user grips the grip section 11 of the controller body 10 so that the plurality of second sensors 22 can detect whether the respective fingers are bent or stretched.

Figure 2:
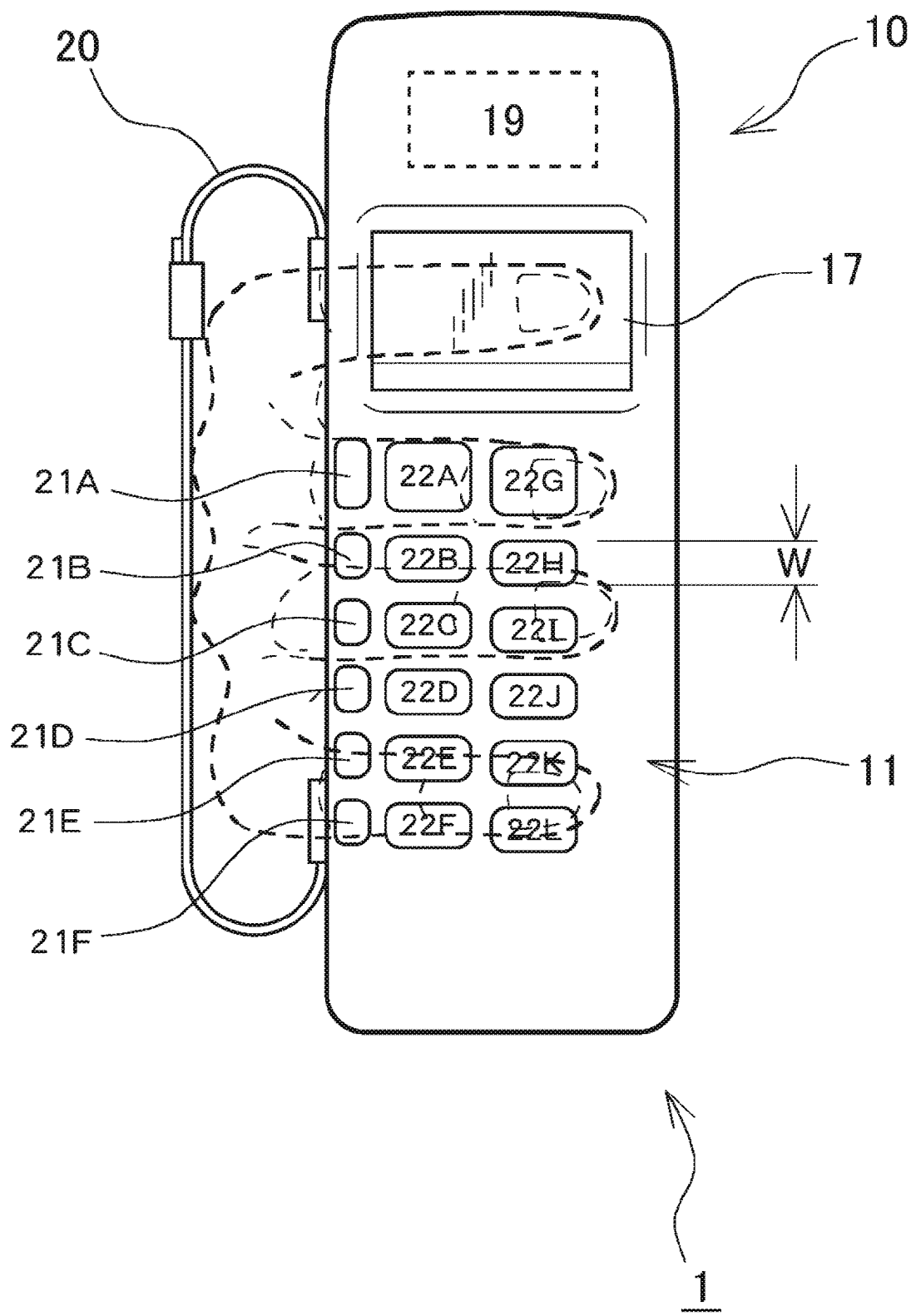
FIG. 2 is an explanatory diagram illustrating an example of layout of first and second sensors of the controller apparatus according to an embodiment of the present invention.

In this example of FIG. 2, electrostatic sensors 21S of the first sensors 21 are each arranged in the row direction of electrostatic sensors 22S of the second sensors 22, and the electrostatic sensors are arranged in a three-by-six grid pattern (oblique grid pattern) in terms of the first and second sensors 21 and 22 as a whole.

It should be noted that, although the first and second sensors 21 and 22 are both electrostatic sensors here as an example, the present embodiment is not limited thereto, and the first and second sensors 21 and 22 may be cameras, optical sensors, pyroelectric sensors, ultrasonic sensors, or the like as long as information commensurate with a relative positional relation with the finger or hand surface (spatial positional displacement such as distances and displacement) can be acquired.

Also, in the example of the present embodiment, a width w (longitudinal width of the grip section 11) of each of detection surfaces of at least some of the second sensors 22 (surface for measuring capacitance or opening surface for introducing infrared light in the case where the second sensors 22 are infrared sensors) is set shorter than the finger width of an ordinary user (anticipated user such as an average adult). This secures the second sensor 22 that is touched by each finger alone. Also, a longitudinal gap of the grip section 11 between the two adjacent second sensors 22 is set even smaller than the width w.

At this time, the width w of the second sensors 22 arranged in the row on the side of the index finger (on the side of the swing button 17) may be set larger than the width w of the other second sensors 22. The reason for this is to ensure reliable detection of the middle finger because the middle finger is anticipated to always come into contact with the second sensors 22 arranged in this row. As described above, there is no need for the width or length of the detection surface to be the same among the respective second sensors 22A, 22B, and so on, and one of the widths may be set larger or smaller than the others. Alternatively, the lengths may be set differently as appropriate commensurate with their purposes.

In the example here, of the second sensors 22, second sensors 22A and 22G with which the middle finger is anticipated to come into contact are arranged to span a larger width than other second sensors 22B, 22C, and the like.

Also, as for the first sensors 21, there is no need for the width or length of the detection surface (surface for measuring capacitance in the case where the first sensors 21 are also electrostatic sensors or opening surface for introducing infrared light in the case where the first sensors 21 are infrared sensors) to be the same among the respective first sensors 21A, 21B, and so on, and one of the widths may be set larger or smaller than the others. Alternatively, the lengths may be set differently as appropriate commensurate with their purposes.

The sensor section 15 of the operation section 12 has, for example, an angle detection range that spans a relatively wide angle from a left-side surface to a right-side surface of the controller body 10 on the front side of the controller body 10 and as viewed toward the front from the controller body 10 around a normal of the surface thereof, detecting the user's thumb in this detection range. Then, the sensor section 15 detects the position where the thumb in question is detected (angle in the angle range), the distance from the sensor section 15 to the user's thumb, and the like, outputting detection result information including these pieces of information to the control circuit 19. For example, a sensor of any kind such as a camera, an optical sensor, a pyroelectric sensor, an ultrasonic sensor, or a capacitive sensor may be used as the sensor section 15.

The button operation section 16 includes a plurality of buttons disposed on the front side of the controller body 10. These buttons are, for example, operated by being pressed down with the user's thumb or the like. Also, at least some of the buttons included in the button operation section 16 may be capable of being not only pressed down but also tilted. In this case, when the user tilts the button in question with the thumb or the like, the button operation section 16 outputs, to the control circuit 19, information indicating the nature of the operation such as a tilting direction and an amount of tilt (amount commensurate with the tilting angle) together with information identifying the operated button in question.

The swing button 17 is disposed at a position where it can be reached by the user's index finger (on the rear side of the controller body 10) with the controller body 10 gripped by the user. The swing button 17 is operated by being pressed in with the user's index finger, outputting information indicating an amount of pressing-in (amount of button travel) to the control circuit 19. Specifically, the configuration of the swing button 17 may include, for example, a potentiometer, but is not limited as long as the amount of pressing-in can be detected.

Also, the control circuit 19 includes a program-controlled device such as a microcomputer and operates in accordance with a program stored in a storage means such as a memory. Also, the control circuit 19 is connected to the first and second sensors 21 and 22 and the sensor section 15, the button operation section 16, and the swing button 17 of the operation section 12, receiving a variety of signals such as signals based on outputs of the first and second sensors 21 and 22 and signals that indicate the nature of operations input from the button operation section 16 and the like and sending the signals to the information processing apparatus 2. The control circuit 19 includes, for example, a wireless communication interface such as Bluetooth (registered trademark) or a wired communication interface such as a universal serial bus (USB) or a wired local area network (LAN), exchanging a variety of signals with the information processing apparatus 2 via this wireless communication interface or wired interface.

[Sensor Detection State]

Figure 3:
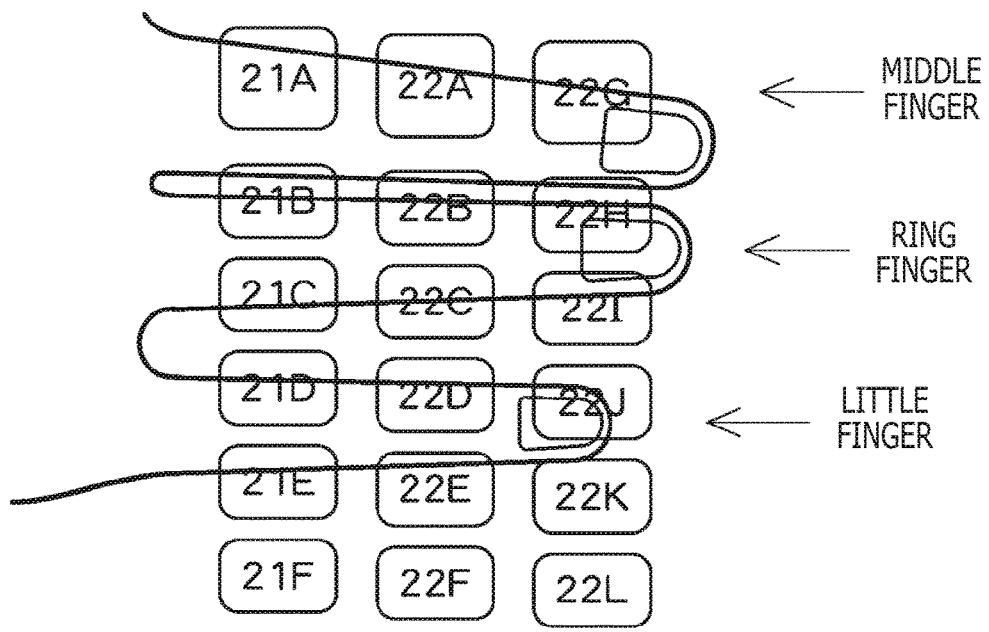
FIG. 3 depicts explanatory diagrams illustrating finger detection states by the first and second sensors of the controller apparatus according to an embodiment of the present invention.
Figure 3:
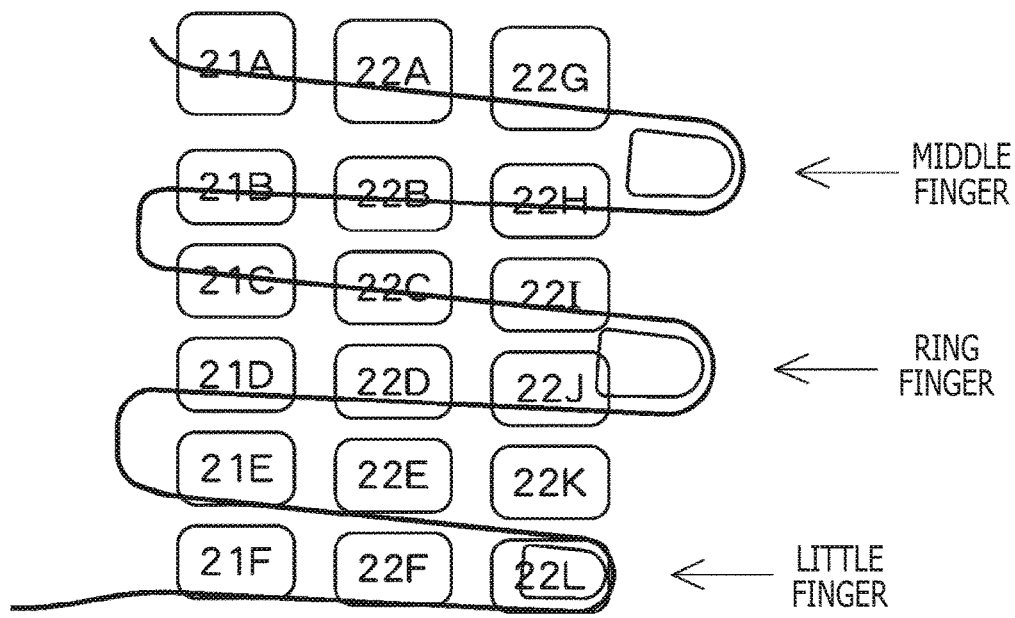

A description will be given here of examples of detection of hands of a variety of sizes by the first and second sensors 21 and 22. FIG. 3(a) is an explanatory diagram illustrating a positional relation between the first and second sensors 21 and 22 and the user's respective fingers when the user with a relatively small hand grips the grip section 11 of the controller body 10. In FIG. 3, the user's hand is depicted as transparent for convenience of description, and although arranged in a curved manner on the surface of the controller apparatus 1 in reality, the first and second sensors 21 and 22 are schematically illustrated in a manner projected onto a plane.

Also, FIG. 3(b) is an explanatory diagram illustrating a positional relation between the first and second sensors 21 and 22 and the user's respective fingers when the user with a relatively large hand grips the grip section 11 of the controller body 10. It should be noted that, in the example of FIG. 3, the six first sensors 21, namely, the first sensors 21A, 21B, and so on up to 21F, are arranged in this order from the side of the index finger (side closer to the swing button 17). Also, illustrated is an example in which the second sensors 22 are arranged in two columns, and the six second sensors 22, namely, the second sensors 22A, 22B, and so on up to 22F, are arranged in this order from the side of the index finger in the column closer to the first sensors 21, and in which the six second sensors 22, namely, the second sensors 22G, 22H, and so on up to 22L, are arranged in this order from the side of the index finger in the column farther from the first sensors 21.

As illustrated in FIG. 3(a), when the user with a relatively small hand grips the grip section 11 and places the index finger at a position where the swing button 17 can be pressed down, some of the first sensors 21 on the side close to the swing button 17 such as the first sensors 21A, 21B, 21C, and 21D detect finger contact.

As described already, the first sensors 21 are disposed in areas with which bases of the user's middle, ring, and little fingers come into contact. Accordingly, regardless of whether the user's fingers are stretched or bent, as long as the user is wearing the controller apparatus 1 in a manner that permits gripping of the grip section 11, the first sensors 21A, 21B, 21C, and 21D regularly detect contact of the fingers with the surface of the grip section 11 of the controller apparatus 1.

Also, while the user grips the grip section 11 in this state, the second sensors 22A, 22C, and 22D are each in contact with the skin of the parts corresponding to proximal phalanges of the middle, ring, and little fingers (parts between metacarpophalangeal joints (MP joints) and proximal interphalangeal joints (PIP joints) including proximal phalanges), and output signals indicating that the user's fingers are in contact with the surface of the grip section 11.

Also further, the second sensors 22G, 22I, and 22J detect contact of parts corresponding to the sides more distal than middle phalanges of the middle, ring, and little fingers, respectively, and output signals indicating that the fingers are in contact with the surface of the grip section 11.

Accordingly, in the description given below, the second sensors 22A and 22G are used to detect the state of the middle finger, and the second sensors 22C and 22I are used to detect the state of (only) the ring finger. Also, the second sensors 22D and 22J are used to detect the state of (only) the little finger. A method of selecting the second sensors 22 for detecting the states of the user's respective fingers in the manner described above will be described later.

Here, when the user slightly stretches his or her fingers (stretches only the fingertips), the finger detection states by the first sensors 21 remain unchanged. With the fingertips detached from the grip section 11, however, the second sensors 22A, 22C, and 22D output signals indicating that the user's fingers are in contact with the second sensors 22A, 22C, and 22D, and the second sensors 22G, 22I, and 22J output signals commensurate with spatial positional displacement between the sensors 22G, 22I, and 22J and the fingertips. For example, the farther the fingertips move away from the sensors 22G, 22I, and 22J, the smaller the output detection values.

As the user continues to stretch the fingers further, the finger detection states by the first sensors 21 remain unchanged. However, with the finger cushions detached from the grip section 11, the second sensors 22A, 22C, and 22D output signals commensurate with spatial positional displacement between the sensors 22A, 22C, and 22D and the fingers or start outputting signals indicating that the fingers are not detected. As for the sensors 22A, 22C, and 22D, as well, for example, the farther the fingertips move away from the sensors 22A, 22C, and 22D, the smaller the output detection values. Then, it is only necessary to determine that the fingers are not detected in the case where these detection values fall below a predetermined threshold. Also, at this time, the second sensors 22G, 22I, and 22J output signals commensurate with spatial positional displacement between the fingertips and the sensors 22G, 22I, and 22J or start outputting signals indicating that the fingers are not detected (detection values lower than the predetermined threshold).

In the case where the user further stretches only the middle finger, the finger detection states by the first sensors 21 remain unchanged. However, the second sensors 22A and 22G with which the middle finger was in contact during gripping output signals commensurate with spatial positional displacement between the sensors 22A and 22G and the fingers or start outputting signals indicating that the fingers are not detected. At this time, the second sensors 22B and 22H are in contact with both the middle and ring fingers. Accordingly, as long as one of the fingers is in contact, the second sensors 22B and 22H continue to output signals indicating that the finger is in contact with the sensors 22B and 22H. That is, in this state (with only the middle finger stretched), the second sensors 22B and 22H output signals indicating that the finger is in contact with the sensors 22B and 22H.

Also, the second sensors 22C, 22D, 22I, and 22J are in contact with the ring and little fingers, respectively. As a result, the sensors 22C, 22D, 22I, and 22J output signals indicating that the user's finger is in contact with these sensors.

Also, when the user with a relatively large hand grips the grip section 11 and places the index finger at a position where the swing button 17 can be pressed down, all the first sensors 21A, 21B, and so on up to the 21F detect that the user's finger is in contact with the first sensors 21, as illustrated in FIG. 3(b). It should be noted that the first sensors 21 are disposed in areas with which the bases of the user's middle, ring, and little fingers come into contact. Accordingly, regardless of whether the user's fingers are stretched or bent, as long as the user is wearing the controller apparatus 1 in a manner that permits gripping of the grip section 11, the first sensors 21A, 21B, 21C, and 21D regularly detect contact of the user's fingers with the sensors 21A, 21B, 21C, and 21D (i.e., the grip section 11).

Also, while the user grips the grip section 11 in this state, the second sensors 22A, 22B, 22C and 22D, 22E, and 22F are each in contact with the skin of the parts corresponding to the proximal phalanges of the middle finger, the middle or ring finger, the ring finger, the ring or little finger, and the little finger (parts between metacarpophalangeal joints (MP joints) and proximal interphalangeal joints (PIP joints) including the proximal phalanges), and output signals indicating that the user's fingers are in contact with the sensors.

Also further, the parts corresponding to the sides more distal than the middle phalanges of the middle finger, the middle or ring finger, the ring finger, the ring or little finger, and the little finger come into contact with the respective second sensors 22G, 22H, 22I and 22J, 22K, and 22L. As a result, the sensors 22G, 22H, 22I, 22J, 22K, and 22L output signals indicating that the user's fingers are in contact with the sensors.

Accordingly, in the description given below, the second sensors 22A and 22G are used to detect the state of the middle finger, and the second sensors 22D and 22J are used to detect the state of (only) the ring finger. Further, the second sensors 22F and 22L are used to detect the state of (only) the little finger (a description will be given later of examples of one and another methods of selecting the second sensors 22 for detecting the states of the user's respective fingers).

Here, when the user slightly stretches his or her fingers (stretches only the fingertips), the finger detection states by the first sensors 21 remain unchanged (a change in detection value is smaller than a predetermined change threshold). With the fingertips detached from the grip section 11, however, the second sensors 22A, 22D, and 22F output signals indicating that the user's fingers are in contact with the sensors 22A, 22D, and 22F, and the second sensors 22G, 22J, and 22L each output signals indicating spatial positional displacement between the sensors 22G, 22J, and 22L and the fingertips.

As the user continues to stretch the fingers further, the finger detection states by the first sensors 21 remain unchanged. However, with the finger cushions detached from the grip section 11, the second sensors 22A, 22D, and 22F start outputting signals indicating spatial positional displacement between the fingers and the sensors 22A, 22D, and 22F (including the case where the signals indicate that the fingers are not detected). Also, the second sensors 22G, 22J, and 22L each start outputting signals indicating spatial positional displacement between the fingertips and the sensors 22G, 22J, and 22L (including the case where the signals indicate that the fingers are not detected).

In the case where the user further stretches only the middle finger, the finger detection states by the first sensors 21 remain unchanged (the change in detection value is smaller than the predetermined change threshold). However, the second sensors 22A and 22G with which the middle finger was in contact during gripping each start outputting signals indicating spatial positional displacement relative to the sensors 22A and 22G (including the case where the signals indicate that the fingers are not detected).

Also, the second sensors 22D, 22F, 22J, and 22L are each in contact with the ring and little fingers and, as a result, output signals indicating that the user's fingers are in contact with these sensors 22D, 22F, 22J, and 22L.

[Sensor Sensitivity Setting]

It should be noted that the first sensors 21 preferably have a higher sensitivity setting than the second sensors 22 to ensure that the finger detection states by the first sensors 21 remain unchanged in the event of slight detachment of the bases of the user's fingers from the first sensors 21 when the user fully stretches the fingers.

Figure 4:
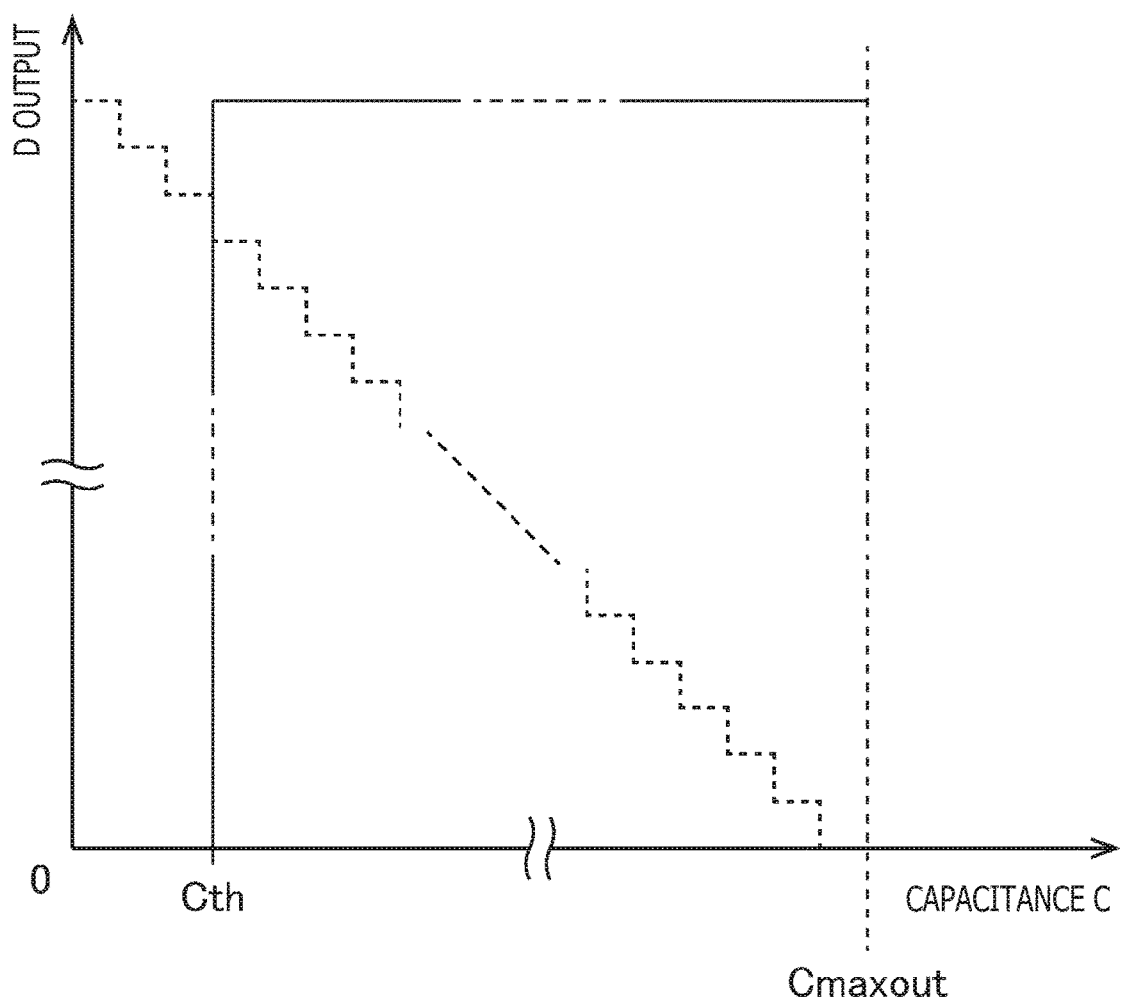
FIG. 4 is an explanatory diagram illustrating examples of output signals of the first and second sensors of the controller apparatus according to an embodiment of the present invention.

Specifically, as illustrated in FIG. 4, while the sensor circuits 22C of the second sensors 22 output values (depicted by a dashed line in FIG. 4) commensurate with spatial displacement (D) relative to the user's fingers that are detection targets, in a multi-step manner (e.g., as an eight-bit signal), commensurate with capacitance (C) of the electrostatic sensors 22S, the sensor circuits 21C of the first sensors 21 are programmed to output a digital value of "255," which is the maximum eight-bit value, when the capacitance (C) of the electrostatic sensors 21S exceeds a predetermined threshold Cth and otherwise output a digital value of "0," which is the minimum eight-bit value (depicted by a solid line in FIG. 4).

As a result, while the second sensors 22 output stepwise signals depending on how close in proximity the user's fingers are, the first sensors 21 output the same signals as those when the user's fingers are in contact with the first sensors 21, in the case where the user's fingers are close in proximity with the first sensors 21 to a certain extent.

[Hysteresis]

Further, hysteresis may be set for outputs of the sensor circuits 21C of the first sensors 21. That is, the sensor circuits 21C corresponding to the respective sensors 21S repeatedly acquire signals (digital values) based on the capacitances of the corresponding sensors 21S at every predetermined timing, each retaining signals (detection values) acquired over the past predetermined number of times (N times) and outputting a predetermined statistical calculation result (e.g., maximum, median, and mean) for the retained signals in question.

Assuming, for example, that the maximum value is output as a statistical calculation result, even in the case where the base of the user's finger is temporarily detached from the sensor 21S with which the base was in contact, the sensor circuit 21C corresponding to the sensor 21S in question outputs a signal indicating the maximum value of the signals acquired over the past N times. As a result, unless the state in which the base is not in contact continues for an extended period of time, the sensor circuit 21C outputs a signal assuming that the base of the user's finger is in contact with the sensor 21.

[Sensor Selection]

Figure 5:
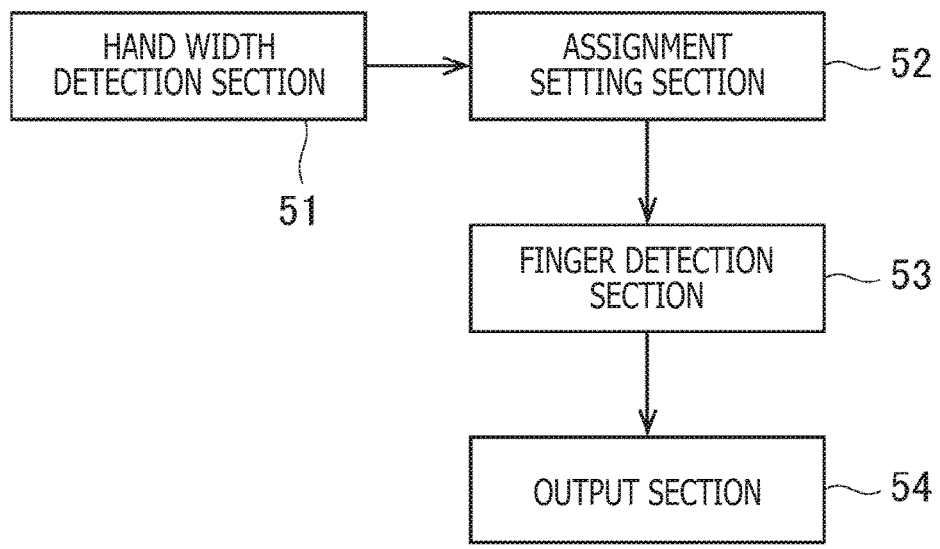
FIG. 5 is a functional block diagram illustrating an example of the controller apparatus according to an embodiment of the present invention.

Also, the control circuit 19 operates as described below in the example of the present embodiment. The control circuit 19 according to an example of the present embodiment functionally includes a hand width detection section 51, an assignment setting section 52, a finger detection section 53, and an output section 54, as illustrated in FIG. 5, by executing a retained program.

It should be noted that, although the control circuit 19 processes signals acquired from other components such as the sensor section 15, the button operation section 16, and the swing button 17, as has been described above, known processes can be used as these processes. Accordingly, a detailed description thereof is omitted here.

The hand width detection section 51 estimates the user's hand width by acquiring signals output from the first sensors 21. Specifically, the hand width detection section 51 first resets a counter to "0" and then examines the output signals of the first sensors 21 (signals indicating capacitances of the corresponding sensors 21S, i.e., detection values) in an order starting from the first sensor 21A disposed on the side of the index finger (on the side of the swing button 17).

Then, if the first sensor 21 examined is detecting finger contact (if the detection value output from the first sensor 21 examined exceeds a predetermined contact determination threshold), the hand width detection section 51 increments the counter by "1." Also, if the first sensor 21 that is not detecting the finger (the first sensor 21 that outputs a detection value less than the predetermined contact determination threshold) is found for the first time, or when the examination of the last first sensor 21 is over, the hand width detection section 51 outputs the counter value at that point in time as information indicating the hand width.

As an example, in the example of FIG. 3(a) illustrating the case where the user with a relatively small hand grips the controller body 10, while the four first sensors 21A, 21B, 21C, and 21D detect finger contact, the first sensors 21E and 21F do not detect any finger contact.

In this case, the hand width detection section 51 examines the output in the order starting from the first sensor 21A and finds, for the first time, the sensor that is not detecting finger contact or the first sensor 21E. Accordingly, assuming that the first sensors 21A, 21B, 21C, and 21D are detecting finger contact, the hand width detection section 51 increments the counter by "1" for each, thus outputting a counter value of "4" at the point in time when the first sensor 21E is examined.

Also, in the example of FIG. 3(b) illustrating the case where the user with a relatively large hand grips the controller body 10, all the first sensors 21A to 21F detect finger contact. In this case, the hand width detection section 51 increments the counter while at the same time examining the output starting from the first sensor 21A and increments the counter assuming that finger contact is detected also by the last first sensor 21F. Accordingly, assuming that all the first sensors 21A to 21F are detecting finger contact, the hand width detection section 51 increments the counter by "1" for each, thus outputting a counter value of "6" at the point in time when the last first sensor 21F is examined.

The assignment setting section 52 selects, from among the plurality of second sensors 22, the one for detecting bending or stretching of each of the user's middle, ring, and little fingers by referring to the value output from the hand width detection section 51, outputting information identifying the selected second sensor 22 in question.

Specifically, the assignment setting section 52 stores, in advance, information identifying the second sensors 22 for detecting bending or stretching of each of the user's middle, ring, and little fingers in association with values output from the hand width detection section 51 (FIG. 6).

In the example of FIG. 6, the assignment setting section 52 retains, with respect to the value (W) output from the hand width detection section 51, pieces of information MM, RM, and PM identifying the second sensors 22 that output signals (detection values) commensurate with spatial positional displacement relative to the parts corresponding to the proximal phalanges of the middle, ring, and little fingers, respectively, in association with pieces of information MF, RF, and PF identifying the second sensors 22 that output signals commensurate with spatial positional displacements relative to the parts corresponding to the sides more distal than the middle phalanges of the middle, ring, and little fingers, respectively.

Although FIG. 6 illustrates settings commensurate with the examples illustrated in FIG. 3 as a specific example, these settings can be determined in a variety of ways including empirically and are determined in advance by the manufacturer of the controller apparatus 1 and stored in the memory of the control circuit 19. It should be noted that these settings may be rewritten in response to an instruction input from the information processing apparatus 2.

Also, the settings here include information identifying the second sensors 22 that output signals commensurate with spatial positional displacement relative to the parts corresponding to the sides more distal than the respective middle phalanges of the middle, ring, and little fingers. However, in the case where only signals commensurate with spatial positional displacement relative to the parts corresponding to the respective proximal phalanges of the middle, ring, and little fingers are output, it is not always necessary to set information identifying the second sensors 22 that detect spatial positional displacement relative to the parts corresponding to the sides more distal than the middle phalanges. Conversely, in the case where only detection results regarding spatial positional displacement relative to the parts corresponding to the sides more distal than the middle phalanges are output, it is not necessary to set the second sensors 22 for outputting signals commensurate with spatial positional changes relative to the parts corresponding to the sides more distal than the respective middle phalanges of the middle, ring, and little fingers.

In the example described below, the parts corresponding to the proximal phalanges and the parts corresponding to the sides more distal than the middle phalanges are not detected separately. Instead, a case is used as an example in which only information identifying the second sensors 22 for detecting the parts corresponding to the proximal phalanges is stored commensurate with the value (W) output from the hand width detection section 51 and in which only signals regarding spatial positional displacements relative to the parts corresponding to the respective proximal phalanges of the middle, ring, and little fingers are output, for the sake of simple explanation.

The finger detection section 53 acquires information output from the assignment setting section 52, selectively outputting information indicating stretching or bending of each of the user's fingers, on the basis of the output of the second sensor 22 identified by the information in question.

Letting pieces of information identifying the second sensors 22 that detect spatial positional displacement relative to the parts corresponding to the respective proximal phalanges of the middle, ring, and little fingers be denoted as MM, RM, and PM, for example, the assignment setting section 52 is assumed to output pieces of information identifying each of the second sensors 22A, 22C, and 22D. In this case, the finger detection section 53 selects and outputs information output from the second sensor 22A as information indicating stretching or bending of the middle finger, information output from the second sensor 22C as information indicating stretching or bending of the ring finger, and information output from the second sensor 22D as information indicating stretching or bending of the little finger.

At this time, signals output from the second sensors 22B, 22E, and 22F are discarded (not output) by this process of the finger detection section 53. The output section 54 sends, to the information processing apparatus 2, information commensurate with spatial positional displacement relative to the respective fingers output from the finger detection section 53 and detected by the respective second sensors 22 selected by the assignment setting section 52 (treated as information indicating stretching or bending of the middle, ring, and little fingers).

That is, when bent, the finger comes into proximity or contact with the grip section 11 of the controller apparatus 1. As a result, the closer the finger is to the second sensor 22 in question, the larger the detection value that is a signal output from the sensor 22 selected as corresponding to each finger, and in the case where the detection value is maximal when the finger is in contact with the sensor 22, the magnitude of this detection value can also be used as information indicating the extent to which the finger is stretched or bent.

[Another Example of Finger Position Estimation]

Also, although, in the description given so far, the control circuit 19 estimates the hand width by using the number of first sensors 21 detecting contact with the user's fingers, selects the second sensor 22 for outputting information regarding each finger on the basis of the estimation result of the hand width in question, and acquires the state of bending or stretching of the fingers by using the detection value output from the selected second sensor 22 in an 'as-is' manner, the present embodiment is not limited thereto.

In an example of the present embodiment, the control circuit 19 functionally includes a hand width detection section 51, an assignment setting section 52, a finger detection section 53, and the output section 54 by executing the retained program, similarly to those illustrated in FIG. 5. It should be noted that components similar to those described already will be denoted by the same reference signs, and a detailed description thereof will be omitted.

Figure 7:
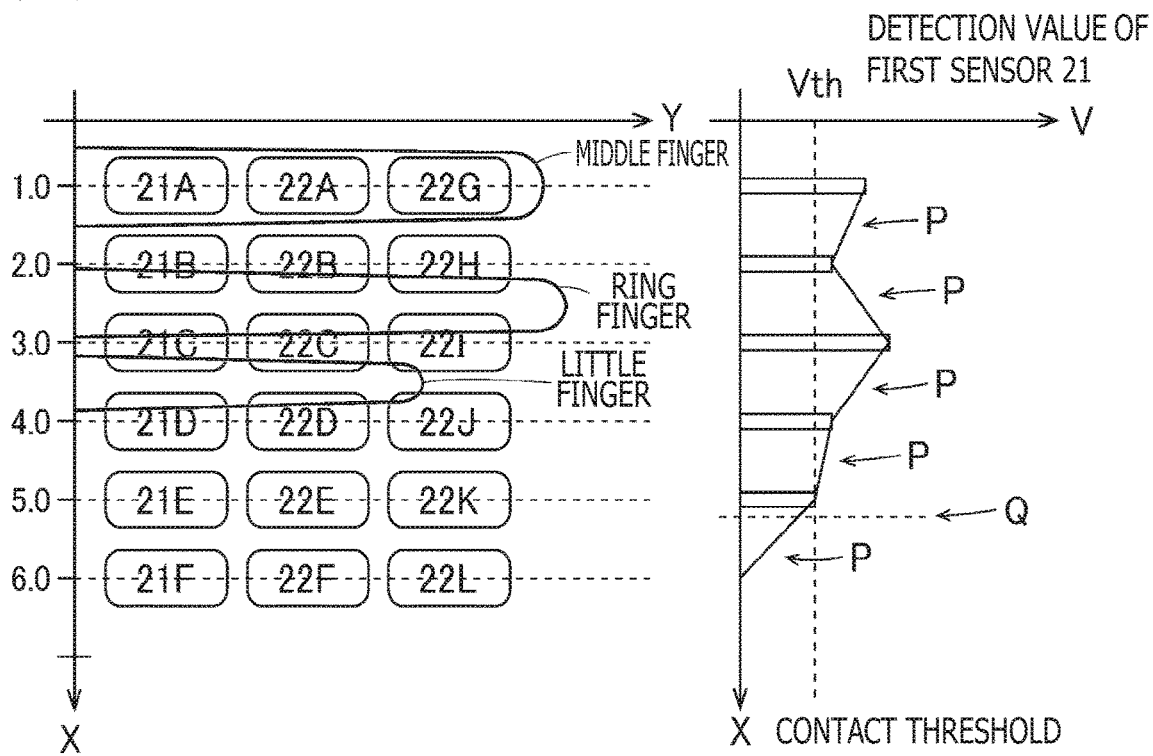
FIG. 7 depicts explanatory diagrams illustrating another example of sensor settings for detecting fingers on the controller apparatus according to an embodiment of the present invention.
Figure 7:
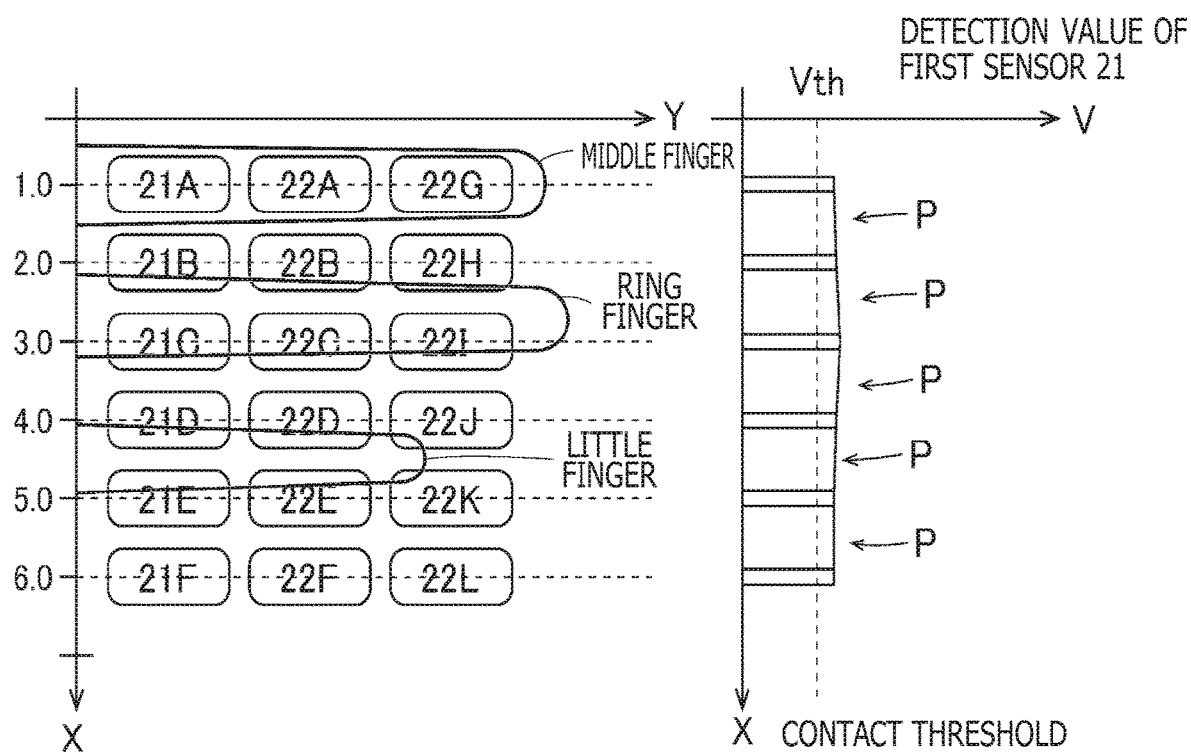

Also, in the description given below, as for the hand width detection section 51 and the like realized by the control circuit 19, a two-dimensional region having the first and second sensors 21 and 22 arranged therein is represented by an XY rectangular coordinate system, and the position and area of each of the first and second sensors 21 and 22 are represented by coordinates (x,y) within this XY rectangular coordinate system, as illustrated in FIG. 7(*a*) or FIG. 7(*b*).

Specifically, in the description given below, when the controller apparatus 1 is gripped by the user in a natural manner, the position in the X-axis direction of the rectangular first sensor 21A disposed at the position corresponding to the base of the middle finger is assumed to be "1.0," the position of the first sensor 21B in the X-axis direction "2.0," and so on up to the position of the first sensor 21F in the X-axis direction being assumed to be "6.0."

Also, the position in the Y-axis direction corresponding to an edge on the opposite side of the side where the second sensors 22 of the first sensors 21 are arranged is assumed to be "0," and the direction in which the first sensors 21 are arranged the X axis, and the direction toward the area where the second sensors 22 are arranged to be orthogonal thereto the Y axis.

The hand width detection section 51 examines the output signals of the first sensors 21 in the order starting from the first sensor 21A (signals indicating capacitances of the corresponding sensors 21S, i.e., detection values).

The hand width detection section 51 determines estimated detection values between the first sensors 21 adjacent to each other (at the positions between center coordinates of pairs of the first sensors 21 adjacent to each other) by interpolating the detection values of the first sensors 21A, 21B, and the like, assuming that the detection values output from the corresponding first sensors 21A, 21B, and the like are acquired at the positions within the coordinate system corresponding to centers of the first sensors 21A, 21B, and the like in a width direction, as illustrated in FIG. 7.

Specifically, in the example given here, an estimated detection value is obtained, for each pair of the first sensors 21 adjacent to each other, at the position between the pair of the first sensors 21 in question by linearly interpolating the detection values of the pair of the first sensors 21.

The hand width detection section 51 searches for a coordinate where the detection value acquired here or the estimated detection value acquired by interpolation is lower than the predetermined contact determination threshold. That is, the hand width detection section 51 searches for a point where a broken line or a curved line drawn by connecting estimated detection values (or detection values) intersects a line segment representing the contact determination threshold as illustrated in FIG. 7.

FIG. 7(*a*) illustrates the case where the base of the middle finger is located at the position of the first sensor 21A and where the base of the little finger is located at the position between the first sensors 21D and 21E and close to the first sensor 21D (it should be noted that the position of the swing button 17 and that of the first sensor 21A are adjusted empirically to ensure that, when the controller apparatus 1 is gripped by the user in a natural manner, the user's middle finger is located on a line extending from the center line in the width direction of the first sensor 21A (in the direction of arrangement of the first sensors 21)).

At this time, the respective detection values of the first sensors 21 indicate that the user's hand (or fingers) is in contact with the first sensors 21A to 21D as illustrated in FIG. 7(a). Also, although the user's hand (or fingers) is in contact with the first sensor 21D, the first sensor 21D is close to the edge of the user's hand or fingers. Accordingly, the detection value of the first sensor 21D is relatively lower than those of the first sensors 21A to 21C. Also, the user's hand or fingers are not in proximity to the first sensor 21E. As a result, the detection value thereof is substantially "0" (a value small enough to be considered "0" although not actually "0" due to noise effect).

The hand width detection section 51 acquires linear interpolations P between the pairs of the first sensors 21 adjacent to each other, i.e., that between the first sensors 21A and 21B, that between the first sensors 21B and 21C, that between the first sensors 21C and 21D, and the like (value interpolated by connecting the detection values of the pair of the first sensors 21 adjacent to each other with line segments).

The hand width detection section 51 searches for a point Q where linear interpolation results are equal to the contact determination threshold. Here, there is no point where the linear interpolation result is lower than the contact determination threshold between the first sensors 21A and 21B, between the first sensors 21B and 21C, and between the first sensors 21C and 21D where the detection values of the adjacent first sensors 21 are greater than the contact determination threshold. Between the first sensors 21D and 21E, however, a detection value Vd of the first sensor 21D (assuming that the center is located at a coordinate xd) is greater than the contact determination threshold, and a detection value Ve of the first sensor 21E (assuming that the center is located at a coordinate xe) is smaller than the contact determination threshold. Accordingly, the point Q with a linear interpolation result equal to the contact determination threshold is present within these linear interpolation results, and the coordinate of the point in question is acquired as a solution to the equation (Vd−Ve)·xq/(xd−xe)+Vd=Vth. The hand width detection section 51 acquires information regarding the position coordinate of the point Q by numerically solving this equation. It should be noted that, if the point Q cannot be found, the X coordinate of the point Q is set to the X-axis position value of the first sensor 21 with the largest X-axis position value of all the first sensors 21 ("6.0" of the first sensor 21F here).

Then, the hand width detection section 51 detects that the user's hand width spans from an edge R (edge on the side far from the first sensor 21B) of the first sensor 21A to this point Q.

In this example, a method not employing interpolation such as linear interpolation determines that the user's hand width spans to the first sensor 21C. According to the example depicted here employing interpolation, however, it is possible to acquire information regarding the user's hand width with more accuracy.

Also, in this example, the assignment setting section 52 selects, as described below, from among the plurality of second sensors 22, the one for detecting bending or stretching of each of the user's middle, ring, and little fingers by referring to the value output from the hand width detection section 51, outputting information identifying the selected second sensor 22 in question.

In this example of the present embodiment, the X-axis position of each finger relative to the hand width is determined in advance as a ratio to the value of the hand width. Specifically, when the hand width detected by the hand width detection section 51 (length from the position between the middle and index fingers to the outer edge of the little finger) is Wh, and letting the center position of the middle finger (represented as the distance from the position between the middle and index fingers; the same applies hereinafter) be denoted as Wh·αm, the center position of the ring finger as Wh·αr, and the center position of the little finger as Wh·αs, these αm, αr, and αs (αm<αr<αs) are determined in advance. It should be noted that a fixed second sensor 22 such as the second sensor 22A or 22G may always be specified for the middle finger. In this case, there is no need to determine αm.

The assignment setting section 52 acquires coordinate information of the center position of each of the user's middle, ring, and little fingers on the basis of these settings. Specifically, assuming that the assignment setting section 52 sets, for example, αr=0.45 and αs=0.74 in advance, and if, in the example illustrated in FIG. 7(a), the hand width is Wh=5.2, the coordinate of the middle finger in the X-axis direction is αr×Wh=2.34, and the coordinate of the ring finger in the X-axis direction is αs×Wh=3.7. Accordingly, in the same group as the second sensor 22A, it is estimated that the middle finger is located at the center of the second sensor 22A, that the ring finger is located between the second sensors 22B and 22C, and that the little finger is located between the second sensors 22C and 22D. Further, in the same group as the second sensor 22G, it is estimated that the middle finger is located at the center of the second sensor 22G, that the ring finger is located between the second sensors 22H and 22I, and that the little finger is located between the second sensors 22I and 22J.

Also, when the hand width is estimated to be Wh=6 in the example of FIG. 7(b), the coordinate of the middle finger in the X-axis direction is αr×Wh=2.7, and the coordinate of the ring finger in the X-axis direction is αs×Wh=4.44. Accordingly, in the same group as the second sensor 22A, it is estimated that the middle finger is located at the center of the second sensor 22A, that the ring finger is located between the second sensors 22B and 22C, and that the little finger is located between the second sensors 22D and 22E. Further, in the same group as the second sensor 22G, it is estimated that the middle finger is located at the center of the second sensor 22G, that the ring finger is located between the second sensors 22H and 22I, and that the little finger is located between the second sensors 22J and 22K.

That is, the assignment setting section 52 determines the second sensor 22 for acquiring information regarding the state of bending or stretching of each of the user's middle, ring, and little fingers for each of different groups of the second sensors 22 that differ in positions in the Y-axis direction.

In the examples of FIGS. 6(a) and 6(b), the second sensors 22 are arranged in a matrix of six rows by two columns with the second sensors 22A to 22F in one column and the second sensors 22G to 22L in another column. Accordingly, the groups of the second sensors 22 having different positions in the Y-axis direction are the group of the second sensors 22A to 22F and the group of the second sensors 22G to 22L. Also assumed here is that the sensors are arranged in such a manner that the positions of the second sensors 22A and 22G in the X-axis direction agree with the position of the first sensor 21A in the X-axis direction, that the positions of the second sensors 22B and 22H in the X-axis direction agree with the position of the first sensor 21B in the X-axis direction, and the like, thus providing "1.0" as the positions of the second sensors 22A and 22G in the X-axis direction, "2.0" as the positions of the second sensors 22B and 22H in the X-axis direction, and the like.

In the case where, for the second sensors 22 included in each group and for each of the user's middle, ring, and little fingers, the coordinate represented by the acquired information in question agrees with (1) a center coordinate X of any one of the second sensors 22 included in the group in question (denoted as a second sensor 22x), the assignment setting section 52 sets the second sensor 22 for detecting bending or stretching of the finger in question as the second sensor 22x in question.

Meanwhile, in the case where, for each of the user's middle, ring, and little fingers, the coordinate represented by the acquired information in question does not agree with (2) the center coordinate of any one of the second sensors 22 included in the group in question, the assignment setting section 52 searches for the second sensor 22x closest to the acquired coordinate in question and a second sensor 22y second closest thereto.

Then, the assignment setting section 52 sets the two second sensors 22x and 22y found by search as the second sensors 22 for detecting bending or stretching of the finger in question.

This process sets, for each group of the second sensors 22 (groups in the Y-axis direction), the second sensor 22 for detecting bending or stretching of each of the user's middle, ring, and little fingers.

For example, in the example of FIG. 7(a), in the same group as the second sensor 22A, for example, it is estimated that the middle finger is located at the center of the second sensor 22A, that the ring finger is located between the second sensors 22B and 22C, and that the little finger is located between the second sensors 22C and 22D. As a result, the second sensors 22A and 22G are set for the middle finger, the second sensors 22B, 22C, 22H, and 22I are set for the ring finger, and the second sensors 22C, 22D, 22I, and 22J are set for the little finger as the second sensors 22 for detecting bending or stretching of the respective fingers.

The finger detection section 53 generates information indicating the state of bending or stretching of each of the user's fingers commensurate with the setting by the assignment setting section 52, on the basis of the output of the second sensor 22 set to detect bending or stretching of each finger, and outputs the information.

Specifically, if the single second sensor 22 has been set to detect bending or stretching of each finger in a group of the second sensors 22, the finger detection section 53 outputs information output from the second sensor 22 in question, as information indicating bending or stretching of the corresponding finger.

Further, if two second sensors 22 have been set to detect bending or stretching of each finger in a group of the second sensors 22, the finger detection section 53 acquires information indicating bending or stretching of the corresponding finger, in the manner described below.

That is, letting the positions of the two second sensors 22 in the X-axis direction be denoted as $X\alpha$ and $X\beta$, the detection values be denoted as $V\alpha$ and $V\beta$, and the X coordinate of the position of the corresponding finger obtained by the assignment setting section 52 be denoted as Xf, information V indicating bending or stretching of the finger to be obtained is set as $V=(V\alpha \cdot |X\alpha-Xf|+V\beta \cdot |X\beta-Xf|)/|X\beta-X\alpha|$ (where |x| means the absolute vale of x). As described above, the finger detection section 53 weights and averages the detection value of each of the second sensors 22 commensurate with the distance from each of the second sensors 22 (the center thereof) to the finger (the center thereof), thus estimating a detection value at the finger center and outputting the estimated detection value in question as information indicating bending or stretching of the corresponding finger.

The output section 54 sends, to the information processing apparatus 2, information commensurate with spatial positional displacement between each finger and the surface of the controller apparatus 1 output from the finger detection section 53 (treated as information indicating the state of bending or stretching of the middle, ring, or little finger).

Also, although the assignment setting section 52 has acquired the X coordinate of the finger position on the basis of the output of the first sensor 21 here, the present embodiment is not limited thereto.

For example, the assignment setting section 52 may estimate the position of each of the user's fingers (the fingertip position) in terms of the position in the column of the second sensors 22A to 22F (Y coordinate) as described below, for example, by using the detection results of the first sensors 21 and the second sensors 22 included in the column of the second sensors 22G to 22L.

In this example, the assignment setting section 52 detects, on the basis of the outputs of the second sensors 22G to 22L, as many detection value peak positions (positions in the X-axis direction), each spanning a range equivalent to the finger width, as the number of fingers present between the second sensors 22 (three here). This detection can be accomplished by fitting the outputs of the second sensors 22G to 22L to a curve function having peaks at three different positions on the X-axis (by curve fitting). In this example, the peak positions on the X-axis are used as fitting parameters, thus allowing the X coordinate value of the peak position corresponding to each finger (position where the center of the tip of each finger is likely located) to be obtained.

The assignment setting section 52 determines, in advance and by the same method as described above, the position of the base of each finger in the X-axis direction relative to a hand with from hand width information output from the hand width detection section 51 as a ratio to the hand width.

As a result, the assignment setting section 52 obtains a position Xmr of the position of the base and a position Xmt of the tip of the middle finger, a position Xrr of the position of the base and a position Xmt of the tip of the ring finger, and a position Xsr of the position of the base and a position Xst of the tip of the little finger.

Then, the assignment setting section 52 virtually sets line segments that connect points equivalent to the X coordinates of the positions of the bases of the respective fingers obtained here at the Y coordinate positions (denoted as Yr) where the first sensors 11 are arranged and points equivalent to the X coordinates of the positions of the corresponding fingers at the Y coordinate values (denoted as Yt) of the positions where the second sensors 22G to 22L are arranged.

For example, a line segment connecting (Xmr,Yr) and (Xmt,Yt) is set for the middle finger. Then, the assignment setting section 52 obtains a position (X,Yp) where each of the line segments set for each of the fingers intersects the Y coordinate value (denoted as Yp) of the positions where the second sensors 22A to 22F are arranged. Specifically, this position can be obtained by setting X=Yp×(Xmt−Xmr)/(Yt−Yr) for the middle finger. This position can be estimated as the position in the X-axis direction where the middle finger passes at the positions where the second sensors 22A to 22F are arranged.

The assignment setting section 52 similarly estimates, for the ring and little fingers, the finger positions in the X-axis direction at the positions where the second sensors 22A to 22F are arranged.

In this case, the finger detection section 53 acquires a detection value of the second sensor 22 included in the group of the second sensors 22A to 22F and obtains an estimated detection value of each finger as described below.

That is, in the case of the above example, letting the respective positions of the second sensors 22A to 22F in the X-axis direction be denoted as $X\alpha$, $X\beta$, and the like, the respective detection values be denoted as $V\alpha$, $V\beta$, and the like, and the X coordinate of the position of the corresponding finger acquired by the assignment setting section 52 be denoted as Xf, the finger detection section 53 sets, for each finger ranging from the middle to little fingers, information indicating bending or stretching of the finger to be obtained (estimated detection value) V, as $V=(V\xi \cdot |X\xi - Xf| + V\eta \cdot |X\eta - Xf|)/|X\eta - X\xi|$ (where |x| means the absolute value of x). Here, $X\xi$ is the position of a second sensor $22\xi$ closest to but not greater than Xf (where $\xi$ is one of A to E), and $V\xi$ is the detection value of the second sensor $22\xi$ in question. Also, $X\eta$ is the position of a second sensor $22\eta$ closest to and greater than Xf (where $\eta$ is one of B to F), and $V\eta$ is the detection value of the second sensor $22\eta$ in question. It should be noted that, when the X coordinate of the position of one of the second sensors 22A to 22F agrees with the X coordinate Xf of the position of the corresponding finger, the information V indicating bending or stretching of the finger to be obtained or the detection value $V\xi$ of the second sensor $22\xi$ present at the X coordinate of the position of the corresponding finger may be used as the estimated detection value of the finger in question in an 'as-is' manner, instead of using the method described above.

In this example, also, the finger detection section 53 weights and averages the detection value of each of the second sensors 22 commensurate with the distance from each of the second sensors 22 (the center thereof) to the finger (the center thereof), thus estimating a detection value at the finger center (estimated detection value) and outputting the estimated detection value acquired, as information indicating bending or stretching of the corresponding finger.

[Calibration]

Also, the sensors 22S of the second sensors 22 vary in individual detection results from one to another in some cases. That is, it is common that the sensors differ in capacitance C0 from each other in the case where the fingers are not in the proximity thereof.

Accordingly, in an example of the present embodiment, the output (hereinafter referred to as a reference capacitance for convenience) C0 with a detection target not in proximity is detected for each of the sensors 22S of the second sensors 22 in advance, and the reference capacitance of the sensor 22S identified by the information in question is stored in the memory of the control circuit 19 in association with information identifying the sensor 22S at the time of manufacture of the controller apparatus 1.

In this example, the control circuit 19 may obtain, for example, in the process of the finger detection section 53 and by using a signal (information indicating capacitance of the corresponding sensor 22S) Ci output from a sensor circuit 22Ci of each of the second sensor $22i$ and a reference capacitance Ci0 stored in association with the sensor 22S in question, a value Ciout output as a signal detected by the second sensor $22i$ in question, as described below (where i=A, B, and the like). Ciout=floor[(Ci−Ci0)/(Cmax−Ci0)×Coutmax] where Cmax represents the value of the maximum capacitance measured, and Coutmax represents the maximum value of the output signal (e.g., "255" in the case of an eight-bit signal). Also, floor[X] indicates that a maximum integer not greater than the calculated X value is obtained.

As a result, it is possible to calibrate each sensor by outputting the ratio of the change in the reference capacitance to a dynamic range (measurable range) of the sensor 22S in question, as a detection result.

It should be noted that the sensors 21S of the first sensors 21 may be calibrated similarly.

In this case, the reference capacitance C0 is similarly measured for each of the sensors 21S and stored in the corresponding sensor circuit 21C. Then, the sensor circuit 21C compares the capacitance (C) of the corresponding electrostatic sensor 21S with a correction threshold Cth' obtained by adding the predetermined threshold Cth and the reference capacitance C0 together. The sensor circuit 21C outputs Coutmax (maximum output signal value; for example, "255" in the case of an eight-bit value) when the capacitance C of the electrostatic sensor 21S exceeds the correction threshold Cth' and otherwise outputs Coutmin (minimum output signal value; for example, "0" in the case of an eight-bit value).

[Detection Threshold of the Finger Contact State]

In the present embodiment, further, a detection threshold of a finger contact state may be corrected to a somewhat low level. That is, the control circuit 19 may obtain, in the process of the finger detection section 53, the value Ciout output as a signal detected by the second sensor $22i$ in question, by using the signal (information indicating the capacitance of the corresponding sensor 22S) Ci output from the sensor circuit 22Ci of each of the second sensors $22i$, as described below (i=A, B, and the like).

Ciout=f[Ci/C'max×Coutmax] where f[X] is a function representing the largest integer not greater than X while X does not exceed Coutmax and representing Coutmax when X exceeds Coutmax. At this time, C'max is set smaller than the maximum value Cmax of Ci (C'max<Cmax). This ensures that the Coutmax value is output when Ci is equal to or greater than C'max. As a result, even if the Ci output value falls lower than what the Ci maximum value should be as a result of a finger being somewhat misaligned and in partial contact, rather than in full contact, with the sensor 22S selected to detect the finger, Cmaxout is output, allowing for the contact state to be identified.

Further, also in this example, the sensors 22S may be calibrated. In this case, the control circuit 19 may obtain, for example, in the process of the finger detection section 53, the value Ciout output as a signal detected by the second sensor $22i$ in question, by using the signal (information indicating the capacitance of the corresponding sensor 22S) Ci output from the sensor circuit 22Ci of each of the second sensors $22i$ and the reference capacitance Ci0 stored in association with the sensor 22S in question, as described below (i=A, B, and the like).

$$Ciout=f[(Ci-Ci0)/(C'max-Ci0) \times Coutmax] \text{ where } f[X]$$
and C'max are similar to those described above.

It should be noted that the value of C'max (referred to as a threshold correction value) here may be set in response to an instruction from the information processing apparatus 2. According to this example, the information processing apparatus 2 can perform such processes as setting the C'max value as close to Cmax as possible when a larger dynamic range is desired for detecting bending or stretching of the fingers and setting C'max such that Cmax−C'max is relatively large to ensure reliable finger contact detection.

[Another Example of Layout of the Sensors 22S]

Although a description has been given so far assuming that the respective sensors 21S and 22S of the first and second sensors 21 and 22 are arranged in an oblique grid pattern as illustrated in the example of FIG. 2, the sensor layout of the present embodiment is not limited thereto.

Figure 8:
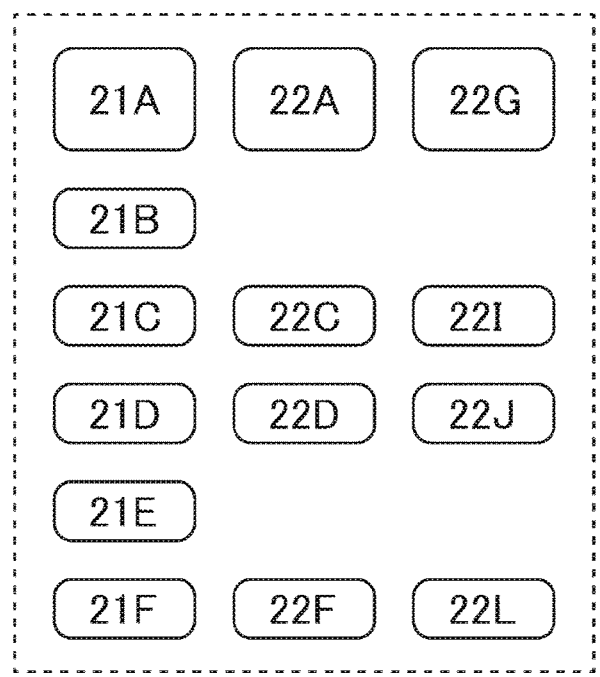
FIG. 8 is an explanatory diagram illustrating another example of layout of the first and second sensors of the controller apparatus according to an embodiment of the present invention.

For example, a configuration having no sensors 22S at some of grid points of the oblique grid in FIG. 2 is possible (FIG. 8). FIG. 8 illustrates an example in which the second sensors 22B, 22E, 22H, and 22K that were not used for finger detection in the examples of FIGS. 3(a) and 3(b) are removed.

[Layout Positions of the First Sensors 21]

Further, the first sensors 21 may be disposed on the side closer to the base of the thumb than the bases of fingers ranging from the index to little fingers (positions equivalent to the MP joints of these four fingers). Specifically, the first sensors 21 may be disposed in an area spanning from positions on the palm side corresponding to the area with which the fixture 20 on a back of the hand comes into contact to the bases of the four fingers ranging from the index to little fingers when the fixture 20 is tightened.

[Detection of the Index Finger]

Also, in the description given so far, the controller apparatus 1 has the swing button 17, and the index finger is placed at a position where the swing button 17 is operated. However, the present embodiment is not limited thereto. For example, the swing button 17 may not be provided, and the index finger may grip the grip section 11 as do the middle to little fingers.

In this case, the layout area of the first sensors 21 is expanded further upward on the controller apparatus 1, and the plurality of first sensors 21 are disposed in an area with which the bases of the index to little fingers come into contact when the user with a relatively large hand grips the grip section 11.

Also, the layout area of the second sensors 22 is expanded further upward on the controller apparatus 1, and the plurality of second sensors 22 are disposed in areas with which the parts more distal than the respective MP joints of the index to little fingers come into contact when the user with a relatively large hand grips the grip section 11, with at least one second sensor 22 disposed in each area.

It should be noted that, also in this case, the control circuit 19 detects the hand width by examining how many first sensors 21 from the index finger side are detecting finger (or palm) contact, selects the second sensors 22 corresponding to at least the number of fingers (four) for detecting bending or stretching of the respective index to little fingers that are determined in advance (e.g., empirically), according to the detected hand width, determines the extent to which each finger is bent or stretched by using the selected second sensors 22 in question, and outputs information indicating the determination results in question.

[Resolution]

Further, although a description has been given so far assuming that the outputs of the first and second sensors 21 and 22, the outputs of the finger detection section 53, and the output section 54 are all eight-bit resolution signals, the present embodiment is not limited thereto.

For example, the outputs of the first and second sensors 21 and 22 may be 16 bits long, the output of the finger detection section 53 (adjusted with the Cmaxout value in the case where the above formula is used) 10 bits long, and that of the output section 54 eight bits long in consideration of communication.

[Processes on the Side of the Information Processing Apparatus]

A description will next be given of an example of processes performed by the information processing apparatus 2 on the basis of information sent from the controller apparatus 1 of the present embodiment.

The information processing apparatus 2 connected to the controller apparatus 1 of the present embodiment repeatedly receives, at every predetermined timing (e.g., every $\frac{1}{60}$ seconds), information indicating hand width detection results and information indicating an amount of bending or stretching of each finger ranging from the middle to little fingers, together with detection results of the sensor section 15, the nature of operations of the button operation section 16, and information indicating the amount of pressing-in of the swing button 17 from the controller apparatus 1.

Also, the information processing apparatus 2 may receive outputs (RAW) outputs of the first and second sensors together with the detection results of the sensor section 15, the nature of operations of the button operation section 16, and the information indicating the amount of pressing-in of the swing button 17 from the controller apparatus 1.

Here, information indicating the amount of bending or stretching of each finger ranging from the middle to little fingers is information that is "0" when the finger is stretched and the maximum value (e.g., "255" in the case of eight-bit information) when the finger is bent and is in contact with the grip section 11, as described earlier. Also, information indicating the hand width is equivalent to the number of the first sensors 21 detecting finger or palm contact (number of the first sensors 21 continuously detecting contact of the fingers or the like from the first sensor 21 on the index finger side) when the user wears the controller apparatus 1 on his or her hand.

The information processing apparatus 2 may perform not only processes of game applications but also, for example, a process of judging whether or not the controller apparatus 1 is gripped firmly (solid gripping determination) as described below, a process of identifying the user, and the like, by using the information indicating the amount of bending or stretching of each finger ranging from the middle to little fingers and the like.

[Solid Gripping Determination]

In an example of the present embodiment, the detection threshold for the finger contact state is corrected to a somewhat low level as described earlier. At this time, the control circuit 19 sets the maximum value C'max of the signal to be used for the finger detection process lower than the maximum value Cmax of the signal Ci output from the second sensor 22 (C'max<Cmax).

Accordingly, in an example of the present embodiment, the control circuit 19 may make the following determination by using the output signal of the second sensor 22.

That is, the control circuit 19 determines whether the finger is bent (the grip section 11 is gripped) or not and whether the grip section 11 is gripped firmly (whether the grip section 11 is gripped solidly) or not, by using each piece of output CM, CR, and CP of the second sensors 22 corresponding to predetermined fingers such as the second sensors 22 corresponding to the respective middle, ring, and little fingers, and the post-correction output value based thereon (e.g., output value calculated by the above Ciout=f [Ci/C'max×Coutmax] where i=M, R, P).

Specifically, the control circuit 19 determines that the finger is bent (the grip section 11 is gripped) when all the post-correction output values Ciout are the maximum value Coutmax (Ci>C'max), and outputs a signal to that effect to the information processing apparatus 2.

Also, the control circuit 19 determines that the user is gripping the grip section 11 solidly when all the pieces of output CM, CR, and CP of the second sensors 22 exceed C'max and when CM+CR+CP>Csum_th is established, and outputs a signal to that effect to the information processing apparatus 2. It should be noted that Csum_th here is a threshold such that 3×Cmax>Csum_th>3×C'max holds.

That is, the control circuit 19 in this example determines that the grip section 11 is gripped solidly in the case where all the outputs of the second sensors 22 (RAW outputs) exceed the maximum value C'max during correction and the sum thereof exceeds the predetermined threshold.

It should be noted that this determination may be made by the information processing apparatus 2 instead of the control circuit 19. In this case, the control circuit 19 sends the outputs of the second sensors 22 (RAW outputs) to the information processing apparatus 2 together with other signal outputs, and the information processing apparatus 2 performs the above processes in place of the control circuit 19 and determines whether or not the user is gripping the grip section 11 solidly.

[Another Example of Solid Gripping Determination]

Also, a determination as to whether or not the user is gripping the grip section 11 solidly may be made in a different way. In this example, the information processing apparatus 2 stores at least N times (where N is an integer equal to or larger than 2) worth of information received in the past indicating the amounts of bending or stretching of the fingers ranging from the middle to little fingers, and calculates variations thereof.

Specifically, the information processing apparatus 2 obtains the following variations by using pieces of information CMi−1, CRi−1, and CPi−1 received previously regarding the amounts of bending or stretching of each of the middle to little fingers and pieces of information CMi, CRi, and CPi (i=1, 2, and the like) received this time regarding the amounts of bending or stretching of each of the middle to little fingers, $$\Delta CMi = CMi - CMi-1$$

$$\Delta CRi = Cri - CRi-1$$

$$\Delta CPi = Cpi - CPi-1.$$

Then, when all the variations obtained exceed a predetermined variation threshold DCth, and when CMi, CRi, and CPi are all equal to or larger than the predetermined contact amount threshold Cth (e.g., Cth may be the maximum value), that is, when "ΔCMi>DCth, ΔCRi>DCth, ΔCPi>DCth, CMi≥Cth, CRi≥Cth, and CPi≥Cth," it is determined that the user is gripping the controller apparatus 1 solidly.

This determination means that the user has gripped the grip section 11 of the controller apparatus 1 by bending his or her fingers relatively quickly.

As described above, the information processing apparatus 2 of the present embodiment may perform predetermined processes commensurate with changes in outputs over time based on detection results of the second sensors 22.

[User Identification]

Also, the information processing apparatus 2 of the present embodiment may perform a user identification process by using information indicating the hand width.

In this example, the user using the information processing apparatus 2 enters information indicating his or her hand width into the information processing apparatus 2 in advance. Specifically, the information processing apparatus 2 guides the user to wear the controller apparatus 1 together with information identifying the user in a user registration process. Then, when the user wears the controller apparatus 1 and information indicating the hand width is received from the controller apparatus 1, the information processing apparatus 2 stores the entered information identifying the user in association with information indicating the hand width.

Thereafter, the information processing apparatus 2 prompts the user to wear the controller apparatus 1 at the time of user identification. When the user wears the controller apparatus 1 and information indicating the hand width is received from the controller apparatus 1, the information processing apparatus 2 acquires information identifying the user associated with the received information indicating the hand width in question. Then, the information processing apparatus 2 performs subsequent processes assuming that the user identified by the acquired information in question has an intention to use the information processing apparatus 2.

Among examples of subsequent processes here is a process performed based on key assignment (settings indicating the specific process to be performed when a specific button is pressed) determined in advance for each identified user.

Also, in another example, the information processing apparatus 2 stores information indicating the hand width received last from the controller apparatus 1, and when information indicating the hand width is next received from the controller apparatus 1, the information processing apparatus 2 compares the received information with the stored information. Then, in the case where these pieces of information are different, the information processing apparatus 2 performs predetermined processes assuming that the user has changed (predetermined process as a process in the case of user change).

[Finger Detection Process]

Although, in the description given so far, information indicating the amount of bending or stretching of each finger based on the outputs of the first and second sensors 21 and 22 is obtained by the controller apparatus 1, the present embodiment is not limited thereto.

For example, the control circuit 19 of the controller apparatus 1 may output the outputs of the first and second sensors 21 and 22 to the information processing apparatus 2 in an 'as-is' manner. In this case, the information processing apparatus 2 may acquire information indicating the amount of bending or stretching of each finger, by receiving the outputs of the first and second sensors 21 and 22 and performing processes involving the hand width detection section 51, the assignment setting section 52, the finger detection section 53, and the output section 54 illustrated in FIG. 5.

[Hand Gesture]

Further, because information indicating bending or stretching of each finger can be acquired in the present embodiment, the information processing apparatus 2 can, for example, recognize that the index and middle fingers are stretched (the stretching of the index finger is estimated, for example, by the fact that the swing button 17 is not pressed down) and that the ring and little fingers are bent (the user is making a peace sign, so to speak, with the fingers).

Accordingly, the information processing apparatus 2 may retain, in advance, a hand gesture in association with details of processes to be performed when the hand gesture is made, so that, when the information processing apparatus 2 recognizes that a hand gesture that agrees with the retained hand gesture has been made, the information processing apparatus 2 performs the processes whose details are retained in association therewith. According to this example, it is possible to control processes to be handled by the information processing apparatus 2 by using hand gestures.

[Attachment Fitting Detection]

Also, although, in the description given so far, the first and second sensors 21 and 22 detect the user's fingers, these sensors may be used to detect other objects in the present embodiment.

For example, in the case where still another attachment can be fitted to an outer periphery of the controller apparatus 1, it is possible to detect fitting of the attachment by disposing targets (e.g., metal plates) to be detected by the first and second sensors 21 and 22 at positions of the attachment that comes into contact with the first and second sensors 21 and 22 at the outer periphery of the controller apparatus 1, although this makes it impossible to detect the fingers.

For example, if metal plates are disposed on the outer periphery of side of the attachment that comes into contact with the second sensors 22A and 22F of the controller apparatus 1 when the attachment is fitted to the controller apparatus 1, information indicating that the fingers are seemingly in contact with the second sensors 22A and 22F but not in other places is output.

When such information is input, the information processing apparatus 2 determines that an attachment has been fitted, performing a predetermined process as a process in the case of fitting of an attachment. Among examples of such attachments is one in the form of an automobile steering wheel.

Also, in the case where a plurality of types of attachments such as steering wheel-shaped attachments and gun-shaped attachments are available, which of the first and second sensors 21 and 22 are to be used to detect the targets (the positions corresponding to which of the sensors the detection targets such as metal plates should be disposed at) may vary from one attachment type to another.

For example, in the case of the steering wheel-shaped attachment, metal plates are disposed on the outer periphery of the side of the attachment that comes into contact with the second sensors 22A and 22F of the controller apparatus 1 when the attachment is fitted to the controller apparatus 1, whereas, in the case of the gun-shaped attachment, metal plates are disposed on the outer periphery of the side of the attachment that comes into contact with the second sensors 22B and 22F of the controller apparatus 1 when the attachment is fitted to the controller apparatus 1.

This makes it possible for the information processing apparatus 2 to identify the attachment type on the basis of output information indicating which sensors are seemingly in contact with the fingers and which others are seemingly not.

It should be noted that, for example, in this case, it is assumed that, of the first sensors 21, no detection target is disposed at a position that comes into contact with the first sensor 21 that is expected to determine finger or palm contact when the user with an ordinary hand size (with a hand not extremely small) wears the controller apparatus 1, for any attachment. This makes it possible for the information processing apparatus 2 to recognize that the detection of the attachment instead of the user's fingers is taking place from the fact that one of the second sensors 22 is detecting finger contact despite an extremely small hand size detected by the first sensors 21 or despite lack of detection of finger contact by the first sensors 21.

REFERENCE SIGNS LIST

1: Controller apparatus
2: Information processing apparatus
10: Controller body
11: Grip section
12: Operation section
15: Sensor section
16: Button operation section
17: Swing button
19: Control circuit
20: Fixture
21: First sensor
22: Second sensor
51: Hand width detection section
52: Assignment setting section
53: Finger detection section
54: Output section

The invention claimed is:

1. A controller apparatus worn on a user's hand, the controller apparatus comprising:
 a controller body;
 a first sensor disposed at a position on the controller body where a plurality of fingers of the user come into contact with the controller body when the user grips the controller body and configured to detect spatial positional displacement between the plurality of respective fingers of the user and itself; and
 a plurality of second sensors disposed in an area on the controller body where the plurality of fingers of the user come into contact with the controller body when the user grips the controller body, the area being different from an area where the first sensor is disposed, and configured to detect spatial positional displacement between the plurality of respective fingers of the user and itself, wherein
 the first sensor has a higher sensitivity setting than the second sensors.

2. The controller apparatus of claim 1, wherein the first sensor is disposed at a position corresponding to bases of the plurality of fingers of the user when the user grips the controller body.

3. The controller apparatus of claim 1, wherein the second sensors are disposed at predetermined positions in an area ranging from cushions to tips of the plurality of fingers of the user when the user grips the controller body.

4. The controller apparatus of claim 1, further comprising:
 a circuit operating to estimate a size of the user's hand on which the controller apparatus is worn by the number of the first sensors detecting finger contact among the first sensors;
 a circuit operating to select, on a basis of the estimated hand size and for each of at least some of the respective fingers of the user, the second sensor for detecting spatial positional displacement from among the plurality of second sensors; and
 a circuit operating to generate information based on the spatial positional displacement of each finger relative to the second sensor in question on a basis of a detection result of the second sensor selected for each of the fingers and outputting the information.

5. The controller apparatus of claim 4, further comprising a circuit operating to measure and record, in advance, reference information measured in a state in which a detection target is not in proximity, for each of the second sensors, to correct the detection result of the selected second sensor as information based on a variation from reference information, and generate information based on spatial positional displacement between each finger and the second sensor in question on a basis of the corrected information, and outputs the information.

6. The controller apparatus of claim 1, further comprising:
- a grip section that is capable of being gripped with the controller apparatus worn on the user's hand,
- wherein the first sensors are arranged along a longitudinal direction of the grip section.

7. The controller apparatus of claim 1, wherein at least one of the second sensors spans a larger width than the other second sensors.

8. A control method of a controller apparatus worn on a user's hand, the controller apparatus including
- a controller body,
- a first sensor disposed at a position on the controller body where a plurality of fingers of the user come into contact with the controller body when the user grips the controller body and configured to detect spatial positional displacement between the plurality of respective fingers of the user and itself, and
- a plurality of second sensors disposed in an area on the controller body where the plurality of fingers of the user come into contact with the controller body when the user grips the controller body, the area being different from an area where the first sensor is disposed, and configured to detect spatial positional displacement between the plurality of respective fingers of the user and itself, wherein
- the first sensor has a higher sensitivity setting than the second sensors,
- a circuit operating to estimate a size of the user's hand on which the controller apparatus is worn, by the number of the first sensors detecting finger contact among the first sensors,
- a circuit operating to select, on a basis of the estimated hand size and for each of at least some of the respective fingers of the user, the second sensor for detecting spatial positional displacement from among the plurality of second sensors, and
- a circuit operating to generate information based on the spatial positional displacement of each finger relative to the second sensor in question on a basis of a detection result of the second sensor selected for each of the fingers and outputs the information.

9. A non-transitory, computer readable storage medium containing a program, which when executed by a computer connected to a controller apparatus worn on a user's hand, the controller apparatus including a controller body, a first sensor disposed at a position on the controller body where a plurality of fingers of the user come into contact with the controller body when the user grips the controller body and configured to detect spatial positional displacement between the plurality of respective fingers of the user and itself, and a plurality of second sensors disposed in an area on the controller body where the plurality of fingers of the user come into contact with the controller body when the user grips the controller body, the area being different from an area where the first sensor is disposed, and configured to detect spatial positional displacement between the plurality of respective fingers of the user and itself, the first sensor having a higher sensitivity setting than the second sensors, causes the computer to carry out actions, comprising:
- estimating a size of the user's hand on which the controller apparatus is worn by the number of the first sensors detecting finger contact among the first sensors;
- selecting, on a basis of the estimated hand size and for each of at least some of the respective fingers of the user, the second sensor for detecting spatial positional displacement from among the plurality of second sensors; and
- generating information based on the spatial positional displacement of each finger relative to the second sensor in question on a basis of a detection result of the second sensor selected for each of the fingers and outputting the information.

* * * * *